(12) United States Patent
Peng

(10) Patent No.: US 12,100,389 B2
(45) Date of Patent: Sep. 24, 2024

(54) INTENT RECOGNITION METHOD AND INTENT RECOGNITION SYSTEM HAVING SELF LEARNING CAPABILITY

(71) Applicant: WIZ HOLDINGS PTE. LTD., Singapore (SG)

(72) Inventor: Yinlu Peng, Singapore (SG)

(73) Assignee: WIZ HOLDINGS PTE. LTD., Singapore (SG)

(*) Notice: Subject to any disclaimer, the term of this patent is extended or adjusted under 35 U.S.C. 154(b) by 255 days.

(21) Appl. No.: 17/818,686

(22) Filed: Aug. 9, 2022

(65) Prior Publication Data

US 2022/0383854 A1 Dec. 1, 2022

Related U.S. Application Data

(63) Continuation of application No. PCT/CN2021/115933, filed on Sep. 1, 2021.

(51) Int. Cl.
*G10L 15/22* (2006.01)
*G10L 15/06* (2013.01)
*G10L 15/18* (2013.01)

(52) U.S. Cl.
CPC ........ *G10L 15/063* (2013.01); *G10L 15/1815* (2013.01); *G10L 15/22* (2013.01); *G10L 2015/227* (2013.01)

(58) Field of Classification Search
CPC ...... G10L 15/1822; G10L 15/22; G06F 40/35
See application file for complete search history.

(56) References Cited

U.S. PATENT DOCUMENTS

| | | | |
|---|---|---|---|
| 9,530,405 B2 * | 12/2016 | Fujii | G10L 15/18 |
| 10,460,034 B2 * | 10/2019 | Jing | G06F 40/268 |
| 11,348,573 B2 * | 5/2022 | Greborio | G10L 15/1815 |
| 11,710,482 B2 * | 7/2023 | Garcia | G10L 15/22 704/275 |
| 2017/0011742 A1 * | 1/2017 | Jing | G06F 40/268 |

* cited by examiner

*Primary Examiner* — Daniel Abebe
(74) *Attorney, Agent, or Firm* — Syncoda LLC; Feng Ma

(57) ABSTRACT

An intent recognition method having a self-learning capability includes the following steps: acquiring a user expression, and recognizing a voice as a corresponding text; performing preliminary intent recognition on the user expression, and outputting candidate intents; acquiring historical data feature parameters of the candidate intents; on the basis of a pre-set rule strategy, deciding whether to directly output a final recognized intent, and on the basis of the feature parameters of each intent, performing rule computation, and outputting a final recognized intent; submitting prediction data of the final recognized intent and the candidate intents from the intent recognition process to a self-learning system, and performing self learning and indicator parameter data updating. The present disclosure is able to perform self learning on the basis of the feature distribution in historical data of intent recognition and dynamically adjust intent recognition strategies.

20 Claims, 2 Drawing Sheets

INTENT RECOGNITION METHOD AND INTENT RECOGNITION SYSTEM HAVING SELF LEARNING CAPABILITY

CROSS-REFERENCE TO RELATED APPLICATIONS

This is a continuation of International Application No. PCT/CN2021/115933 filed on Sep. 1, 2021, which claims priority to Chinese Patent Application No. 202010758935.1 filed on Jul. 31, 2020. The disclosures of the above-referenced applications are hereby incorporated by reference in their entirety.

BACKGROUND

With the development of artificial intelligence (AI) and machine learning technologies, an intelligent speech dialogue system is more and more widely used in various fields. Speech recognition, Speech Synthesis and Natural Language Understanding are main technical points of the intelligent speech dialogue system, and the development of these technologies also promotes the evolution of various capabilities in the intelligent dialogue system.

SUMMARY

The present disclosure relates generally to the technical field of intention recognition, and more specifically to an intention recognition method having a self-learning capability and an intention recognition system.

A technical problem to be solved by some embodiments of the present disclosure is that the accuracy of intention recognition according to some implementations of intention recognition technology is overly dependent on the quality of rules or model training data, and in the process of use, it does not have the ability of self-learning, and requires continuous manual intervention to maintain and provide the accuracy of intention recognition. The present disclosure is capable to perform the self-learning according to feature distributions of historical data about the intention recognitions in an actual usage scenario of the intelligent speech dialogue system and the terminal, and dynamically adjust the strategy of intention recognition to improve the accuracy rate of the intention recognition in the usage scenario.

The present disclosure adopts the following technical solutions to solve the above-mentioned technical problems. An intention recognition method having a self-learning capability used for an intelligent speech dialogue system is provided. The intention recognition method having the self-learning capability specifically includes the following steps:

step 1, acquiring a user expression and recognizing the user expression as a corresponding text by a speech recognition technology;

step 2, outputting candidate intentions by performing, according to configurations of a preset strategy, a preliminary intention recognition on the user expression;

step 3, acquiring feature parameters of historical data about the candidate intentions by initiating, according to a contextual scenario of a current intention recognition, a query to an intention scenario feature self-learning system with taking the candidate intentions as a query condition;

step 4, determining, according to a preset intention selection rule strategy, whether directly output a final recognition intention, or further recognize the candidate intentions using other intention recognition algorithm configured in the intention selection rule strategy and output the final recognition intention by performing a rule calculation based on feature parameters of respective candidate intentions; and step 5, performing self-learning and updating data about indicator parameters by submitting prediction data related to both of the candidate intentions and the final recognition intention during the intention recognition to the self-learning system.

As a further preferred solution of the intention recognition method having the self-learning capability used for the intelligent speech dialogue system of the present disclosure, in the step 1, the acquiring the user expression comprises acquiring voice frequency signals of the user expression via an intelligent dialogue system or a terminal.

As a further preferred solution of the intention recognition method having the self-learning capability used for the intelligent speech dialogue system of the present disclosure, in the step 2, the outputting the candidate intentions specifically comprises outputting candidate intention classifications with high similarity by performing the preliminary intention recognition on the text of the user expression outputted by the step 1; and the performing the preliminary intention recognition comprises quickly analyzing the user expression via a rule template, a text classification algorithm model with low computational cost, and a semantic slot value extraction algorithm model.

As a further preferred solution of the intention recognition method having the self-learning capability used for the intelligent speech dialogue system of the present disclosure, in the step 3, the acquiring the feature parameters of historical data about the candidate intentions comprises: acquiring, according to a dialogue contextual scenario of the user expression, features of historical records about the intention recognition in the contextual scenario; and extracting scenario feature parameters of candidate intention classifications outputted by a previous step, such as a proportion of a certain intention that is hit within all intention recognition historical data in the contextual scenario, and proportions of respective corpuses under a certain intention classification within the all intention recognition historical data.

As a further preferred solution of the intention recognition method having the self-learning capability used for the intelligent speech dialogue system of the present disclosure, in the step 4, performing the preset intention selection rule strategy comprises determining, according to the preset strategy, whether the candidate intentions need to be predicted using a higher-cost intention recognition technology, and outputting respective accuracy prediction scores of all candidate intentions; and performing the rule calculation based on the scenario feature parameters of all candidate intentions acquired in a previous step and outputting the final recognition intention.

As a further preferred solution of the intention recognition method having the self-learning capability used for the intelligent speech dialogue system of the present disclosure, in the step 5, the submitting to the self-learning system comprises submitting the candidate intentions and the final recognition intention and respective scenario feature parameters thereof predicted in the above steps to a self-learning data analysis system, so as to perform a real-time or regular data analysis and a regression testing and update data related to the scenario feature parameters of the intention recognition.

An intent recognition system of an intent recognition method having a self-learning capability used for an intelligent speech dialogue system, comprising:

a user expression acquisition module configured to convert voice of user expression into a string text and provide the string text to other modules for intent recognition;

an intention recognition algorithm module configured to, according to a definition of a service interface, perform actions inside of the intention recognition algorithm module by taking the string text of the user expression and a type of an invoked intention recognition algorithm as inputs, and output an intention to which the string text of the user expression belongs, wherein the actions comprises a semantic analysis, a rule matching, a keyword matching and a text classification calculation process.

an intention recognition strategy engine module configured to receive configurations of an intention recognition strategy pre-defined by a user, invoke a customized intention recognition algorithm based on the configurations of the intention recognition strategy, and acquire data from an intention scenario feature self-learning module and submit data to the self-learning module, so as to select a final recognition intention and update self-learning data; and the intention scenario feature self-learning module configured to perform self-learning on historical data of intention recognitions reported by the intention recognition strategy engine module, and provide indicator parameters about contextual scenario-based historical data in an intention recognition stage to determine the selected final intention.

In some embodiments, the intention recognition system further includes a display screen configured to display an output of the intention recognition.

In some embodiments, the intention recognition system further includes a camera configured to capture the user expression.

In some embodiments, the intention recognition system further includes a microphone configured to capture a voice of the user.

In some embodiments, the intention recognition system further includes a speaker configured to play a sound output of the intention recognition.

In some embodiments, the intention recognition system further includes one or more processors configured to perform the steps.

In some embodiments, the intention recognition system further includes a terminal, wherein the one or more processors are configured to perform self-learning according to feature distributions of historical data about intention recognitions in a usage scenario of the intelligent speech dialogue system and the terminal and dynamically adjust the strategy of intention recognitions, thereby improving accuracy rate of the intention recognition in the usage scenario.

In some embodiments, the accuracy rate of intention recognition has a reduced dependence on a correct rate of rule configuration and quality of training data of the intention recognition model, and manual intervention is reduced in the process of using the intelligent voice dialogue system and the terminals while maintaining the accuracy rate of the intent recognition.

In another aspect, a non-transitory computer-readable medium is provided, having instructions stored thereon for execution by one or more processing circuits to implement the intention recognition method.

The intention recognition method according to some embodiments of the present application is a computer-implemented. For example, the method can be implemented with one or more computers, with one or more processors.

The intention recognition results can be outputted to user(s) through one or more display screens, one or more speakers, etc.

Compared with the some other implementations, embodiments of the present disclosure can adopt the above technical schemes, and can have one or more of the following advantages.

Embodiments of the present disclosure are capable of performing self-learning according to feature distributions of the historical data about intention recognitions in an actual usage scenario of the intelligent speech dialogue system and the terminal and dynamically adjust the strategy of intention recognitions, thus the accuracy rate of the intention recognition in the usage scenario is improved.

In addition, after adopting the above technical solutions, the accuracy rate of intention recognition no longer strongly depends on the correct rate of rule configuration and the quality of the training data of the intention recognition model, and can also be effectively reduce manual intervention in the process of using intelligent voice dialogue systems and terminals, thus the accuracy rate of intent recognition is maintained.

DETAILED DESCRIPTION

Figure 1:
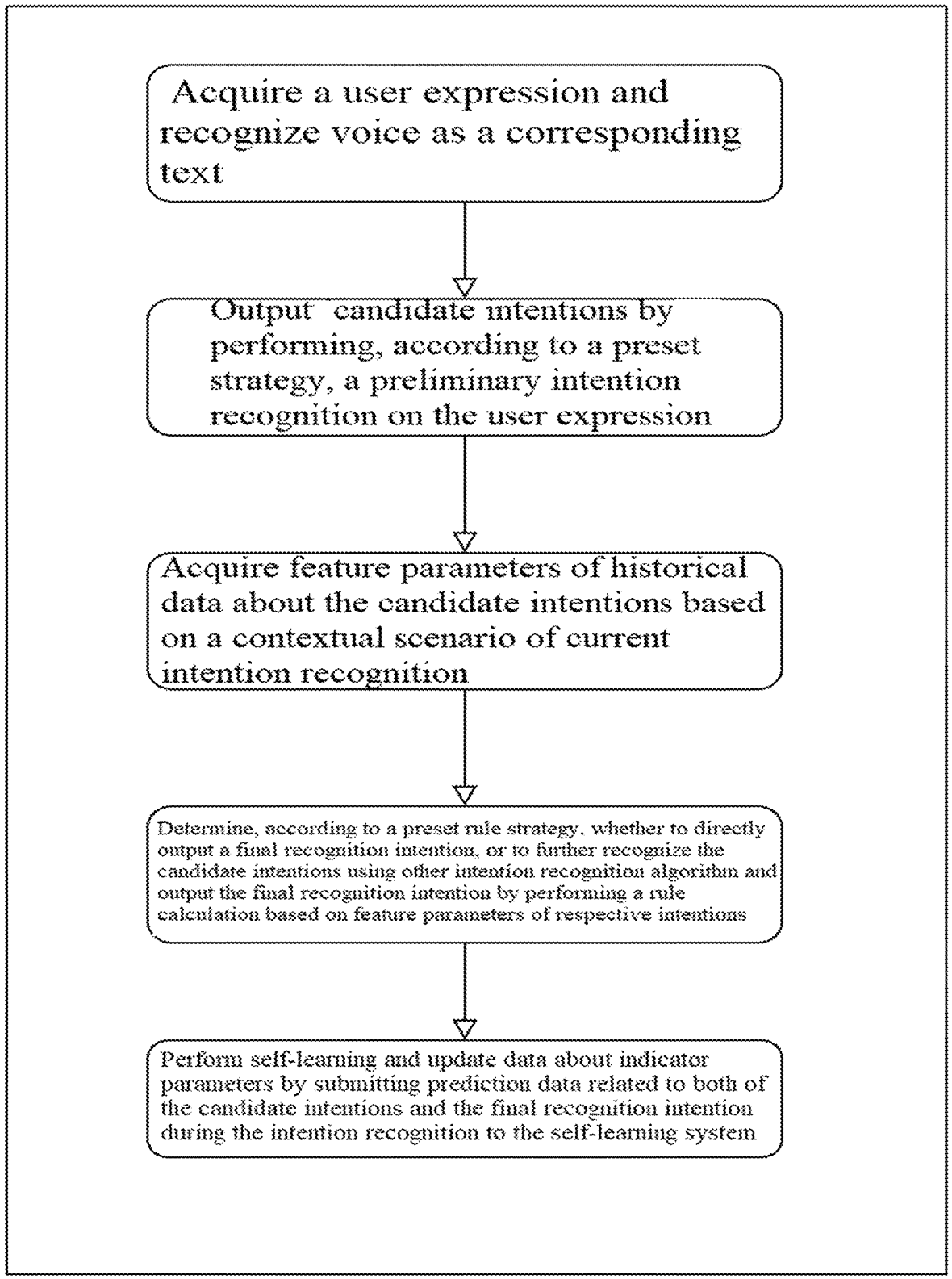
FIG. 1 is a flow chart of intention recognition having a self-learning capability and self-learning according to some embodiments of the present disclosure.

The technical solutions according to some embodiments of the present disclosure are further described in detail below in conjunction with accompanying drawing.

The technical solution in the embodiments of the present disclosure will be clearly and completely described below with reference to the accompanying drawings in the embodiments of the present disclosure. Apparently, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

Intention recognition belongs to the technical category of Natural Language Understanding, and refers to outputting a true intention expressed by a user by recognizing and processing user's expression. Intelligent dialogue systems can organize correct replies based on the user's intention to facilitate a normal conversation. In the process of intention recognition, no matter what type of intention recognition technology is used, it will involve a process of selecting a final intention from a plurality of candidate intentions, and the correctness of the selected final intention may directly affect whether the conversation can proceed correctly.

Some intention recognition schemes mainly include Rule-Based intention recognition and Machine Learning Model-Based intention recognition.

However, no matter which intention recognition technology is selected, it has to solve the problem of selecting a final intention from a plurality of intentions. With the Rule-Based intention recognition technology, the final intention may be selected according to a length or an edit distance of a matched text. With the Machine Learning Model-Based intention recognition, a plurality of intentions are generally sorted according to intention scores and the intention with a highest score is selected, but this result depends too much on the quality of the model, i.e., the quality of the corpus for training the model.

Therefore, a main problem is that it is necessary to continuously adjust and optimize the rules according to the existing problematic intention recognition records, or to expand and optimize the corpus for training the model, so as to improve or maintain the accuracy rate of intention recognition. Furthermore, it is impossible to dynamically optimize the intention recognition based on the actual scenario and the characteristics of historical records about the intention recognition, and adjust the accuracy rate of intention recognition through the way of self-learning and related recognition strategies.

In the field of intelligent speech dialogue, the intention recognition technology means that in the process of human-computer interaction, the intelligent speech dialogue system analyzes and recognizes a natural language text expressed by the user, and obtains an intention expressed by the user. In general, the intention recognition is also known as intention classification, i.e., classifying user expressions into respective intention categories according to customized intention domains and intentions.

Intelligent Question & Answer system is a typical intelligent speech dialogue system. The user can ask a question in natural language, and the system needs to recognize the user's true question and search for an answer according to the question. In this scenario, the ability of intention recognition is an ability to recognize the user's true question, and the system can provide the user with the correct answer only if the system has such ability.

Some intelligent speech dialogue systems and terminals generally use the following technologies to perform the intention recognition.

Rule Template-Based Intention Recognition

This technique classifies an intention text using artificially constructed keywords, regular expressions, and other common rule templates. The Rule Temple-Based intention recognition method does not require a large amount of training data and can quickly verify the accuracy of the rules, so it requires very little resource consumption during use and is widely applicable to a cold start phase of the intention recognition module. In terms of effect, the Rule Temple-Based intention recognition method may have a high accuracy rate in the event that the number of intention categories is low, but as the number of intention categories increases, it will face the problem that several intentions are hit, and it is difficult to maintain the high accuracy rate.

Text Edit Distance-Based Intention Recognition

The text edit distance refers to the minimum number of edit operations required to convert one into the other between two string texts. The so-called edit operation means the operation of deleting, adding or replacing a character with another character.

The text edit distance is originally used to calculate the similarity of two texts. It is necessary to artificially construct the intention classification and a text corpus under each intention classification. When a text of the user expression and a certain corpus text have the smallest edit distance therebetween, the intention classification where the corpus text is located is selected as a result of the intention recognition.

Text Classification-Based Intention Recognition

This technology also requires artificially constructed intention classifications and a corpus text under each intention classification. The corpus text is required to cover a general Wording-and-Phrasing expressed by the most users and then manual marking and extending for the corpus are required to optimize and expand the dataset. In general, by extracting various features from the dataset, training and optimal-tuning the model, and then using the model to perform an intention recognition and prediction on the text of the user expression, the model will output a name and a prediction score of the intention classification of the intention that has been hit. The text classification-based intention recognition technology is a popular intention recognition technology after the development of machine learning technology, but this technology has a high requirement on the quality of the dataset for training the model, and its intention recognition effect often depends on the quality of the training dataset.

First, in the above implementations of intention recognition technologies, whether it is the rule template-based intention recognition, the edit distance-based intention recognition, or the text classification-based intention recognition, has high quality requirements on predefined rules, intention classifications and intention corpuses. Secondly, it cannot perform self-learning on the intention recognition ability according to historical request results of the intention recognition, and cannot adapt to different and various ways of expressing user's intentions and impossible to choose the true intentions in different scenarios. A problem to be solved by some embodiments of the present disclosure is the accuracy rate of intention recognition in some other implementations of intention recognition technology depends too much on the quality of the rules or the model training data, and in the process of use, those implementations of intention recognition technology do not have the ability of self-learning, and requires continuous manual intervention to maintain and provide the accuracy rate of intention recognition.

The intention recognition method having a self-learning capability provided by the present disclosure can perform self-learning according to feature distributions of the historical data about intention recognitions in an actual usage scenario of the intelligent speech dialogue system and the terminal, and dynamically adjust the strategy of intention recognition, thus the accuracy rate of the intention recognition in the usage scenario is improved.

This intention recognition method having a self-learning capability is used for intelligent speech dialogue system, as shown in FIG. 1. The intention recognition method having the self-learning capability may include the following steps:

step 1, acquiring a user expression and recognizing the user expression as a corresponding text by a speech recognition technology;

step 2, outputting candidate intentions by performing, according to configurations of a preset strategy, a preliminary intention recognition on the user expression;

step 3, acquiring feature parameters of historical data about the candidate intentions by initiating, according to a contextual scenario of a current intention recognition, a query to an intention scenario feature self-learning system with taking the candidate intentions as a query condition;

step 4, determining, according to a preset intention selection rule strategy, whether to directly output a final recognition intention, or to further recognize the candidate intentions using other intention recognition algorithm configured in the intention selection rule strategy and output the final recognition intention by performing a rule calculation based on feature parameters of respective candidate intentions; and step 5, performing self-learning and updating data about indicator parameters by submitting prediction data related to both of the candidate intentions and the final recognition intention during the intention recognition to the self-learning system.

The step of acquiring the user expression comprises obtaining voice frequency signals of the user expression via an intelligent dialogue system or a terminal and recognizing the user expression as a corresponding text by the speech recognition technology.

The step of recognizing the candidate intentions comprises outputting candidate intention classifications with high similarity by performing the preliminary intention recognition on the text of the user expression outputted by the previous step; and the performing the preliminary intention recognition comprises quickly analyzing the user expression via a rule template, a text classification algorithm model with low computational cost, and a semantic slot value extraction algorithm model.

The step of acquiring the scenario feature comprises: acquiring, according to a dialogue contextual scenario of the user expression, features about historical records of the intention recognition in the contextual scenario; and extracting scenario feature parameters of candidate intention classifications outputted by the previous step, such as a proportion of a certain intention that is hit within all intention recognition historical data in the contextual scenario, and proportions of respective corpuses under a certain intention classification within the all intention recognition historical data, etc.

The step of performing intention selection strategy comprising determining, according to the preset strategy, whether the candidate intentions need to be predicted using a higher-cost intention recognition technology, and outputting respective accuracy prediction scores of all candidate intentions; and performing the rule calculation based on the scenario feature parameters of all candidate intentions acquired in a previous step and outputting the final recognition intention.

The step of self-learning of scenario features comprises submitting the candidate intentions and the final recognition intention and related respective scenario feature parameters thereof predicted in the above steps to a self-learning data analysis system, so as to perform a real-time or regular data analysis and a regression test and update data related to the scenario feature parameters of the intention recognition.

In order to understand the technical content and implementation manner of the present disclosure more clearly, specific implementation cases are given and described in conjunction with the accompanying drawings as follows.

In the implementation process of the present disclosure, the following modules, i.e., a user expression acquisition module, an intention recognition algorithm module, an intention recognition strategy engine module, and an intention scenario feature self-learning module, will be involved in the cooperative work, and the functional scope and cooperation process of each module in the present disclosure will be described below with reference to the accompanying drawings.

In the user expression acquisition module, a user expression is generally what a user says. The user expression acquisition module needs to invoke ASR (i.e., speech into text) service to convert voice expressed by the user into a string text, and provide the string text to other modules for intention recognition.

The intention recognition algorithm module generally contains the implementations of a plurality of independent intention recognition algorithms, including the implementation of the rule template-based intention recognition algorithm or the text classification-based intention recognition algorithm described in the present disclosure. According to the definition of a service interface, the intention recognition algorithm module takes the string text of the user expression and the type of the invoked intention recognition algorithm as inputs, and performs processes inside the module, such as semantic analysis, rule matching, keyword matching and text classification calculation, etc., and outputs an intention to which the text of the user expression might belong. According to the implementations of different intention recognition algorithms, the outputted intention may be one intention or a plurality of intentions, and the details of the outputted intention recognitions may also be inconsistent. For example, the rule matching-based intention recognition not only outputs the intention recognized by matching, but also outputs specific rules of the matching and hitting; the text edit distance-based intention recognition method will additionally output the recognized intention and its corresponding value representing the edit distance.

The intention recognition strategy engine module is not only an execution module of the intention recognition strategy, but also an invoker of the intention recognition algorithm. The input of the intention recognition strategy engine module is configurations of the intention recognition strategy pre-defined by the user, and the configurations are generally organized in JSON or XML serialization. The intention recognition strategy engine module invokes customized intention recognition algorithm according to the configurations of intention recognition strategy, and acquires data from the self-learning module and submits data to the self-learning module for selecting a final intention and updating the self-learning data. The following is an example configuration of an intention recognition strategy.

The intention scenario feature self-learning module performs self-learning on the intention recognition historical data reported by the intention recognition strategy engine module, and provides indicator parameters about the contextual scenario-based historical data in the intention recognition stage to determine the selected final intention.

Figure 2:
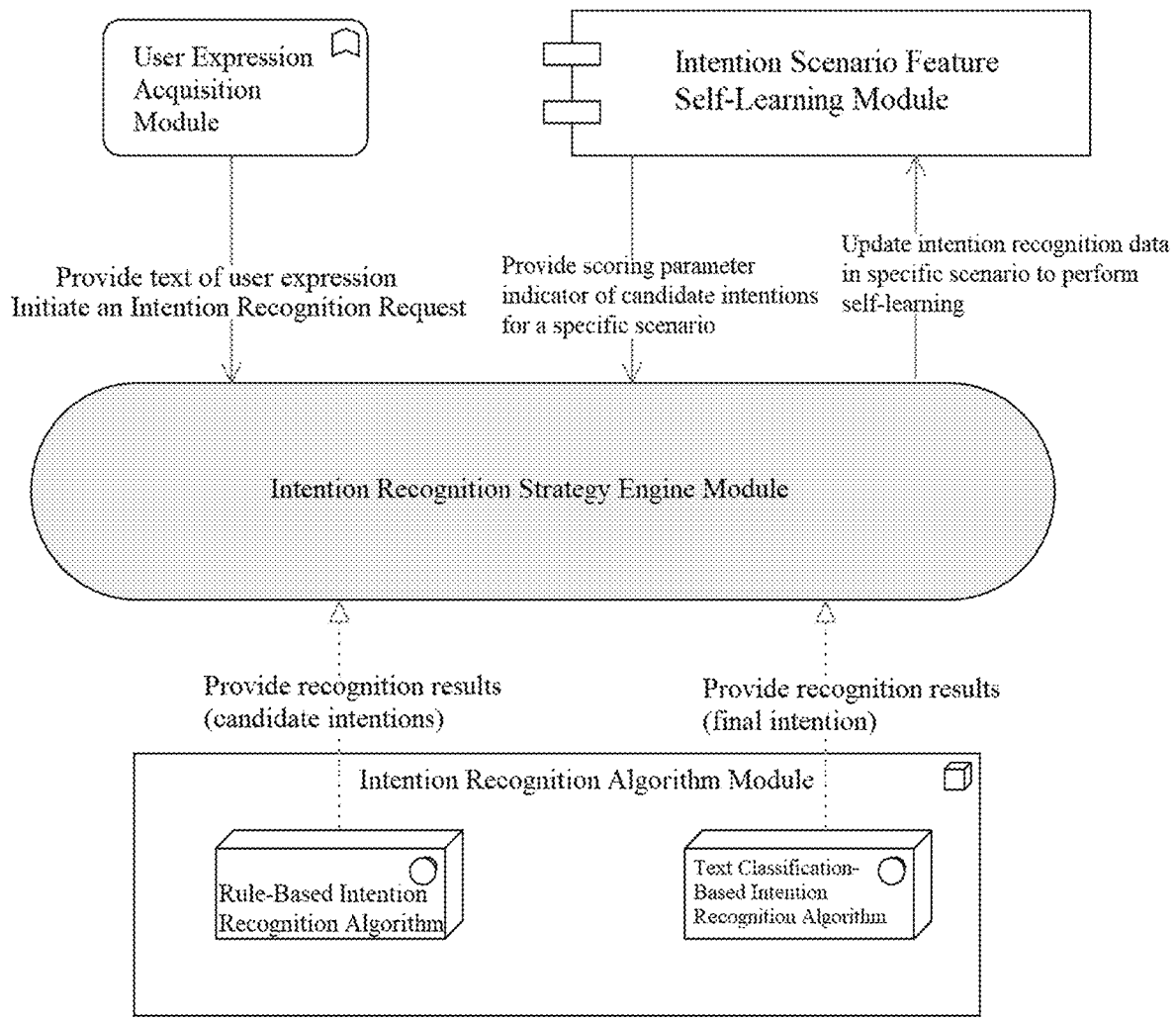
FIG. 2 is a schematic diagram of cooperative work interaction of intention recognition modules according to some embodiments of the present disclosure.

FIG. 2 is a schematic diagram of cooperation and interaction of various modules in the process of intention recognition.

In order to more clearly describe the functional scope of each module involved in the implementation process of the present disclosure in each step of intention recognition and self-learning, the following will take a specific scenario as an example to describe the intention recognition method having the self-learning capability in detail.

1. The user expression acquisition module of the intelligent speech dialogue system or the terminal receives voice of the user expression of 'Please buy two tickets for me', and recognizes it as the corresponding text.
2. The intention recognition strategy engine module first invokes, according to the preset strategy, the rule template-based intention recognition method from the intention recognition algorithm module to perform the preliminary intention recognition, and then acquires corresponding candidate intentions of 'buy movie tickets' and 'buy train tickets'.
3. The intention recognition strategy engine module obtains respective distribution weight values of the two candidate intentions in the contextual scenario of the session from the intention scenario feature self-learning module using a unique identifier corresponding to the contextual scenario of the session.

4. The intention recognition strategy engine module invokes the intention recognition algorithm of text classification from the intention recognition algorithm module and acquires respective prediction scores of the two candidate intentions, such as 'buy movie tickets' and 'buy train tickets' respectively have the prediction scores of 0.9 points and 0.85 points.

5. The intention recognition strategy engine module performs a weighted calculation on the prediction scores and the intention distribution weights provided by the intention scenario feature self-learning module, and outputs 'purchase movie tickets' as the final intention based on the final score.

The intention recognition strategy engine module submits the result of this intention recognition and related calculation data to the intention scenario feature self-learning module, and the intention scenario feature self-learning module performs self-learning calculations and updates the indicator data related to the intention in this scenario.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

It may be further understood that terms "first", "second", etc. are used to describe various types of information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, first information may also be referred to as second information, and similarly, the second information may also be referred to as the first information.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The above-mentioned embodiments are only specific implementations of the present disclosure, and are used to illustrate the technical solutions of the present disclosure, but not to limit them. The protection scope of the present disclosure is not limited thereto. Although the present disclosure has been described in detail with reference to the foregoing embodiments, those of ordinary skill in the art should understand that any person skilled in the art who is familiar with the technical field can make modifications or changes that can be easily conceived to the technique solutions described in the foregoing embodiments or make equivalent replacements to some of the technical features within the technical scope disclosed in the present disclosure; and these modifications, changes or replacements do not make the essence of the corresponding technical solutions depart from the spirit and scope of the technical solutions in the embodiments of the present disclosure. All of them should be covered within the scope of protection of the present disclosure. Therefore, the protection scope of the present disclosure should be subject to the protection scope of the claims.

It will be understood by those skilled in the art that, unless otherwise defined, all terms (including technical and scientific terms) used herein have the same meaning as commonly understood by one of ordinary skill in the art to which the present disclosure belongs. It should also be understood that terms such as those defined in the general dictionary should be understood to have meanings consistent with their meanings in the context of the art and, unless defined as herein, are not explained in an idealized or overly formal sense.

The above embodiments are only to illustrate the technical idea of the present disclosure, and cannot limit the protection scope of the present disclosure. Any modification made on the basis of the technical solution according to the technical idea proposed by the present disclosure falls within the protection scope of the present disclosure. The embodiments of the present disclosure have been described in detail above, but the present disclosure is not limited to the above-mentioned embodiments, and within the scope of knowledge possessed by those of ordinary skill in the art, various changes can also be made without departing from the spirit of the present disclosure.

What is claimed is:

1. An intention recognition method having a self-learning capability used for an intelligent speech dialogue system, comprising following operations:
    first operation, acquiring a user expression and recognizing the user expression as a corresponding text by a speech recognition technology;
    second operation, outputting candidate intentions by performing, according to configurations of a preset strategy, a preliminary intention recognition on the user expression;
    third operation, acquiring feature parameters of historical data about the candidate intentions by initiating, according to a contextual scenario of a current intention recognition, a query to an intention scenario feature self-learning system with taking the candidate intentions as a query condition;
    fourth operation, determining, according to a preset intention selection rule strategy, whether to directly output a final recognition intention, or to further recognize the candidate intentions using other intention recognition algorithm configured in the intention selection rule strategy and output the final recognition intention by performing a rule calculation based on feature parameters of respective candidate intentions; and
    fifth operation, performing self-learning and updating data about indicator parameters by submitting prediction data related to both of the candidate intentions and the final recognition intention during the intention recognition to the self-learning system.

2. The intention recognition method having a self-learning capability used for the intelligent speech dialogue system according to claim 1, wherein, in the first operation, the acquiring the user expression comprises acquiring voice frequency signals of the user expression via an intelligent dialogue system or a terminal.

3. The intention recognition method having a self-learning capability used for the intelligent speech dialogue system according to claim 1, wherein, in the second operation, the outputting the candidate intentions specifically comprises outputting candidate intention classifications with high similarity by performing the preliminary intention recognition on the text of the user expression outputted by the first operation; and the performing the preliminary intention recognition comprises quickly analyzing the user expression via a rule template, a text classification algorithm model with low computational cost, and a semantic slot value extraction algorithm model.

4. The intention recognition method having a self-learning capability used for the intelligent speech dialogue system according to claim 1, wherein, in the third operation, the acquiring the feature parameters of historical data about the candidate intentions comprises: acquiring, according to a dialogue contextual scenario of the user expression, features of historical records about the intention recognition in the contextual scenario; and extracting scenario feature parameters of candidate intention classifications outputted by a previous step, such as a proportion of a certain intention that is hit within all intention recognition historical data in the contextual scenario, and proportions of respective corpuses under a certain intention classification within the all intention recognition historical data.

5. The intention recognition method having a self-learning capability used for the intelligent speech dialogue system according to claim 1, wherein, in the fourth operation, performing the preset intention selection rule strategy comprises determining, according to the preset strategy, whether the candidate intentions need to be predicted using a higher-cost intention recognition technology, and outputting respective accuracy prediction scores of all candidate intentions; and performing the rule calculation based on the scenario feature parameters of all candidate intentions acquired in a previous step and outputting the final recognition intention.

6. The intention recognition method having a self-learning capability used for the intelligent speech dialogue system according to claim 1, wherein, in the fifth operation, the self-learning system comprises submitting the candidate intentions and the final recognition intention and respective scenario feature parameters thereof predicted in the above steps to a self-learning data analysis system, so as to perform a real-time or regular data analysis and a regression testing and update data related to the scenario feature of the intention recognition.

7. An intention recognition system based on the intention recognition method having a self-learning capability used for the intelligent speech dialogue system according to claim 1, comprising:
    a user expression acquisition circuit configured to convert voice of user expression into a string text and provide the string text to other circuits for intent recognition;
    an intention recognition algorithm circuit configured to, according to a definition of a service interface, perform actions by taking the string text of the user expression and a type of an invoked intention recognition algorithm as inputs, and output an intention to which the string text of the user expression belongs, wherein the actions comprise a semantic analysis, a rule matching, a keyword matching and a text classification calculation process;

an intention recognition strategy engine circuit configured to receive configurations of an intention recognition strategy pre-defined by a user, invoke a customized intention recognition algorithm based on the configurations of the intention recognition strategy, and acquire data from an intention scenario feature self-learning circuit and submit data to the self-learning circuit, so as to select a final recognition intention and update self-learning data;

and the intention scenario feature self-learning circuit configured to perform self-learning on historical data of intention recognitions reported by the intention recognition strategy engine circuit, and provide indicator parameters about contextual scenario-based historical data in an intention recognition stage to determine the selected final intention.

8. The intention recognition system according to claim 7, further comprising a display screen configured to display an output of the intention recognition.

9. The intention recognition system according to claim 8, further comprising a camera configured to capture the user expression.

10. The intention recognition system according to claim 9, further comprising a microphone configured to capture a voice of the user.

11. The intention recognition system according to claim 10, further comprising a speaker configured to play a sound output of the intention recognition.

12. The intention recognition system according to claim 7, further comprising one or more processors configured to perform the steps.

13. The intention recognition system according to claim 12, further comprising a terminal, wherein the one or more processors are configured to perform self-learning according to feature distributions of historical data about intention recognitions in a usage scenario of the intelligent speech dialogue system and the terminal and dynamically adjust the strategy of intention recognitions, thereby improving accuracy rate of the intention recognition in the usage scenario.

14. The intention recognition system according to claim 13, wherein the accuracy rate of intention recognition has a reduced dependence on a correct rate of rule configuration and quality of training data of the intention recognition model, and manual intervention is reduced in the process of using the intelligent voice dialogue system and the terminals while maintaining the accuracy rate of the intent recognition.

15. A non-transitory computer-readable medium having instructions stored thereon for execution by one or more processing circuits to implement the intention recognition method according to claim 1.

16. The non-transitory computer-readable medium according to claim 15, wherein in the first operation, the acquiring the user expression comprises acquiring voice frequency signals of the user expression via an intelligent dialogue system or a terminal.

17. The non-transitory computer-readable medium according to claim 16, wherein in the second operation, the outputting the candidate intentions specifically comprises outputting candidate intention classifications with high similarity by performing the preliminary intention recognition on the text of the user expression outputted by the first operation; and the performing the preliminary intention recognition comprises quickly analyzing the user expression via a rule template, a text classification algorithm model with low computational cost, and a semantic slot value extraction algorithm model.

18. The non-transitory computer-readable medium according to claim 17, wherein in the third operation, the acquiring the feature parameters of historical data about the candidate intentions comprises: acquiring, according to a dialogue contextual scenario of the user expression, features of historical records about the intention recognition in the contextual scenario; and extracting scenario feature parameters of candidate intention classifications outputted by a previous step, such as a proportion of a certain intention that is hit within all intention recognition historical data in the contextual scenario, and proportions of respective corpuses under a certain intention classification within the all intention recognition historical data.

19. The non-transitory computer-readable medium according to claim 18, wherein in the fourth operation, performing the preset intention selection rule strategy comprises determining, according to the preset strategy, whether the candidate intentions need to be predicted using a higher-cost intention recognition technology, and outputting respective accuracy prediction scores of all candidate intentions; and performing the rule calculation based on the scenario feature parameters of all candidate intentions acquired in a previous step and outputting the final recognition intention.

20. The non-transitory computer-readable medium according to claim 19, wherein in the fifth operation, the self-learning system comprises submitting the candidate intentions and the final recognition intention and respective scenario feature parameters thereof predicted in the above steps to a self-learning data analysis system, so as to perform a real-time or regular data analysis and a regression testing and update data related to the scenario feature of the intention recognition.

* * * * *